Figure 1:
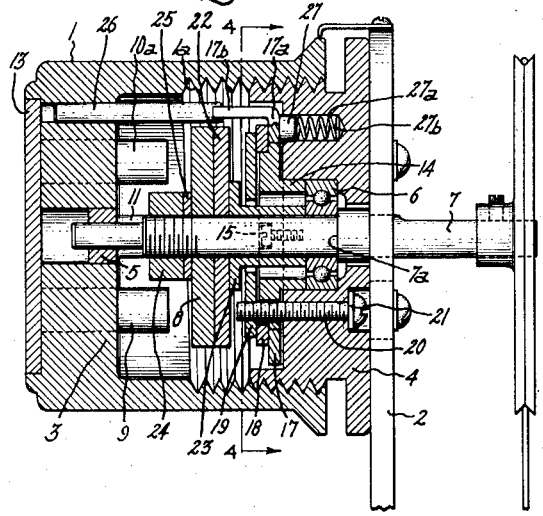

Aug. 19, 1952  E. B. JUDD ET AL  2,607,820
ADJUSTABLE TORQUE DEVICE
Filed June 27, 1951

Inventors:
Edwin B. Judd,
Anthony Butrym,
by  *Their Attorney.*

Patented Aug. 19, 1952

2,607,820

UNITED STATES PATENT OFFICE 2,607,820

ADJUSTABLE TORQUE DEVICE

Edwin B. Judd and Anthony Butrym, Schenectady, N. Y., assignors to General Electric Company, a corporation of New York Application June 27, 1951, Serial No. 233,894

4 Claims. (Cl. 172—285)

This invention relates to magnetic torque devices, and more particularly to magnetic drag devices of the hysteresis type useful as clutching or braking elements. It is particularly applicable to braking or tensioning devices for spindles, reels or pulleys used in the textile or wire twisting and coil winding industries or other winding and reeling applications.

Devices embodying this invention may be used to apply braking torque to a spindle, reel or pulley, and thus to maintain tension on an elongated filament such as a thread or a wire.

Hysteresis torque devices characteristically develop a substantially constant torque and are thus particularly useful as braking or tensioning devices in winding and reeling operations. An important aspect of this invention is that when applied to such braking or tensioning devices it provides a novel means for adjusting the torque which it exerts to a desired value within a predetermined range of values.

A general object of this invention is the provision of a simple, reliable and improved torque device of the magnetic drag type.

A further object of the invention is the provision of a torque device of the magnetic drag type having a device for easily setting the maximum and minimum values of the range of torque adjustment during assembly and for easily adjusting the torque to any value within the range.

Another object of the invention is the provision of a magnetic torque device in which the value of the torque desired is adjusted by means of two relatively rotatable threaded members and in which means are provided for applying a drag between the two members such that one member can be rotated by hand relative to the other member but will remain in the position in which it is set for ordinary vibration encountered in wire twisting, coil winding, textile fabricating and other industrial machinery.

In carrying the invention into effect in one form thereof, a plurality of permanent bar magnets are mounted on the inside face of the end wall closing one end of a cylindrical magnet holder with their magnetic axes parallel to the longitudinal axis of the cylinder. The opposite end of the magnet holder is closed by means of a supporting plate with which it is in threaded engagement. A shaft extends through the supporting plate into the interior of the magnet holder and is mounted for rotation by means of bearings in the supporting plate, and end wall of the magnet holder. An annular member of magnetic material is mounted on the shaft for rotation therewith in a plane separated from the exposed ends of the magnets by a small air gap.

Adjacent the inner face of the supporting plate a second annular member is mounted on the shaft for rotation therewith. At is periphery it carries an upright member having a slot that is open ended toward the magnets. A stop ring is mounted adjacent this second annular member for rotation about the axis of the shaft. At its periphery it carries a projecting stop which extends into the path of rotation of the slotted upright member to be rotated thereby. A pin mounted in the end wall of the magnet holder with its axis parallel to the axis of the shaft advances into the open ended slot of the upright member and thus rotates the upright member and the stop ring in response to screwing together the supporting plate and magnet holder to decrease the air gap between the magnets and the annular member. For the purpose of securing the stop ring in a fixed position when the maximum air gap corresponding to the desired minimum torque has been attained, a clamping ring is provided adjacent the stop ring together with screws extending through the supporting plate to tighten the clamping ring against the stop ring to prevent further rotation and thereby to set the minimum torque value. From this maximum air gap position, with the movable upright member against one side of the stop, the magnet holder can be unthreaded approximately one revolution until the upright member is rotated into engagement with the opposite side of the stop member which thus determines the minimum air gap or maximum torque position. Friction means retain the magnet holder and supporting plate against any ordinary vibration in any intermediate torque position.

Figure 2:
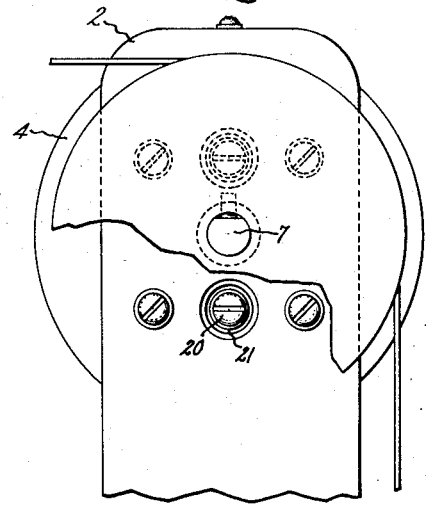
Figure 3:
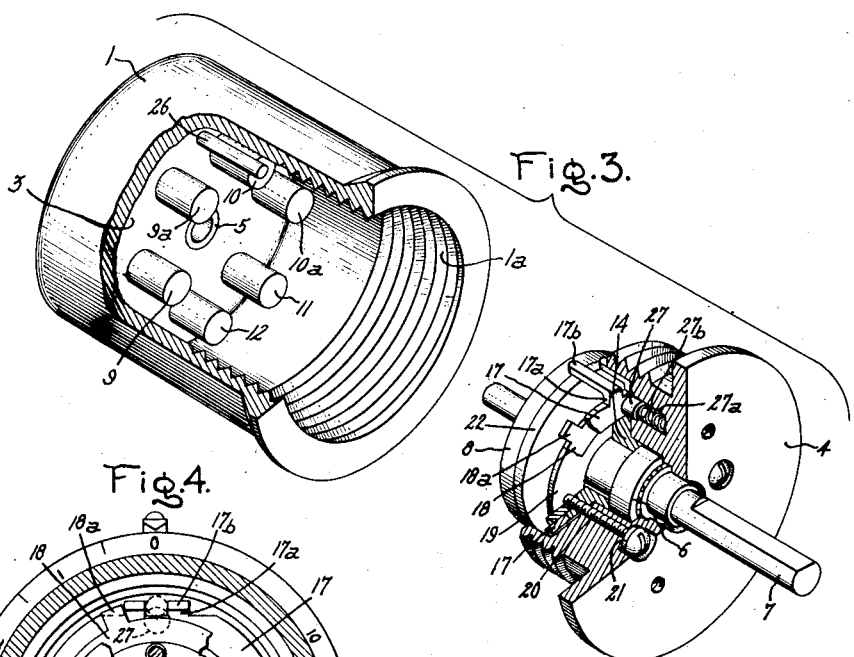
Figure 4:
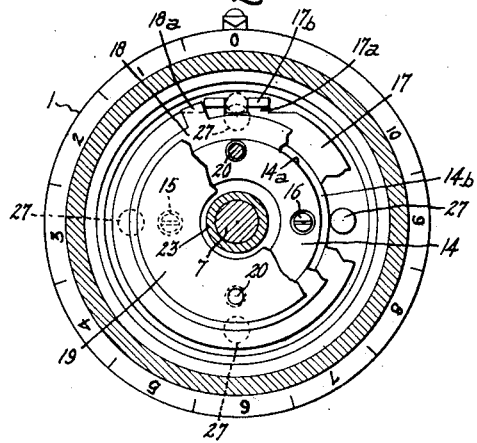

For a better and more complete understanding of the invention, reference should now be had to the following specification and to the accompanying drawing of which Fig. 1 is a longitudinal axial sectional view of an embodiment of the invention; Fig. 2 is a front elevation of the device of Fig. 1; Fig. 3 is a view in perspective with the magnet holder and mounting plate separated, and with parts of each broken away or sectioned to reveal the internal construction and arrangement; and Fig. 4 is a sectional view taken on the line 4—4 of Fig. 1 looking in the direction of the arrows with parts broken away to reveal other parts.

Referring now to the drawing, a hysteresis torque device is illustrated as comprising a cylindrical magnet holder or housing 1 fixedly mounted on a support 2.

One end of magnet holder 1 is permanently closed by an end wall 3 and the open end is threaded to 1a to receive a threaded mounting plate 4. The magnet holder and the mounting plate may be made of any suitable material such, for example, as aluminum alloy or they may be made of a suitable plastic material.

A bushing or sleeve bearing 5, which preferably is made of bronze, is mounted in a centrally disposed opening in the end wall 3 and a ballbearing 6 is press fitted in a centrally disposed recess in the mounting plate 4. A main shaft 7, which is preferably made of steel is journaled for rotation in the bearings 5 and 6.

The bushing 5, permits relative axial movement between the shaft and the magnet holder when the magnet holder is threaded on the mounting plate. A shoulder 7a on the shaft bears against the outer face of the inner race of the ball bearing 6 and thus prevents any inwardly directed axial movement of the shaft with respect to the mounting plate.

Within the magnet holder 1 there is mounted on the shaft for rotation therewith an annular disk-like member 8 which is preferably made of a magnetizable material such as that described and claimed in U. S. Patents 1,947,274 and 1,968,569 issued February 23 and July 31, 1934, respectively, to William E. Ruder. Such material comprises 6% to 15% aluminum, 12% to 30% nickel, approximately 5% copper and the remainder iron. It is a high energy permanent magnet material having a large hysteresis loss characteristic.

Fixedly mounted within the magnet holder 1, are a plurality of pairs of permanent bar magnets 9, 9a, 10, 10a, and 11, 12. They are arranged equally spaced from each other in a circle concentric with the central longitudinal axis of shaft 7. They are mounted in the end wall 3 with their magnetic axes parallel to the longitudinal axis of the shaft and with one pole of each adjacent a face of the magnetic annular disk member 8 and spaced therefrom by a small air gap. The polarity of the poles adjacent the annular member 8 are alternately north and south. These magnets are preferably made of the same material as that from which the annular disk member 8 is made. An outstanding characteristic of this material is that when magnetized the resulting magnet has an extremely high coercive force. An external end plate 13 which is preferably made of steel provides a return path for the magnetic flux for the pairs of magnets.

A flanged spacer bushing 14 fits snugly against the inner face of the outer race of the ballbearing 6. It is secured to the mounting plate 4 by diametrically opposite disposed machine screws 15 and 16. Preferably, it is made of steel but it could be made of a non-magnetic material such as brass.

An annular member 17 having an inside diameter slightly greater than the outside diameter of the flanged spacer bushing is mounted loosely for rotation in the annular groove formed by the mounting plate and the periphery of the spacer bushing. In other words, it surrounds the bushing. At its periphery it is provided with an upright portion 17a which is turned up at right angles to the plane of the member 17. This upright portion is bifurcated to provide a slot that is open ended toward the end wall 3 of the magnet holder.

The length of the leading tine 17b exceeds the length of the trailing tine by an amount which is slightly greater than the pitch of the threads 1a.

The exposed face of the flanged portion of the spacer bushing 14 is recessed at its periphery to provide a portion 14a of reduced diameter which serves as a bearing surface for a stop ring 18 and also to provide a shoulder 14b which serves to space the stop ring from the annular member 17. This stop ring is preferably made of steel. At its periphery the stop ring 18 is provided with radially projecting stop 18a which extends into the path of rotation of the upright member 17a so as to be rotated thereby when the latter is rotated.

A clamping ring 19 is mounted adjacent the stop ring 18 and is provided with two threaded holes to receive two machine screws 20. These screws extend through the mounting plate to provide external means for tightening the clamping ring against the stop ring thereby to secure the stop projection 18a in a desired position. Lock washers 21 serve to prevent the screws 20 from becoming loosened by vibration.

A magnetic backing ring 22 which is preferably made of steel is mounted on the shaft 7 between the annular magnetic member 8 and the flange surface of a flanged spacer 23, the open cylindrical end of which abuts against the inside face of the inner race of the ballbearing 6. As shown, the shaft 7 is threaded to receive a nut 24. A washer 25 spaces the nut from the annular magnetic member.

A pin 26 is pressed into an opening in the end wall 3 of the magnet holder at a radial distance from the central axis of the shaft 7 equal to the radial distance of the bifurcated member 17a from the central axis of the shaft. It extends parallel to the axis of the shaft and advances into the open ended slot between the tines of the bifurcated member which is rotated by the pin about the axis of the shaft when the magnet holder is threaded on the mounting plate.

For the purpose of applying a braking force between the magnet holder 1 and the mounting plate 4 so that the two relatively rotatable parts will remain in the position in which they are set for all ordinary vibration encountered in operation, a plurality of frictional drag units, are provided. As illustrated, each drag unit comprises a friction button 27 made of a suitable fibre material set in an opening 27a in the mounting plate and biased against the annular ring 17 which carries the bifurcated upright member by means of a spring 27b.

In assembling the device, the permanent magnets 9, 9a, 10, 10a, 11 and 12, the bushing 5 and the pin 26 are mounted in the end plate 3. The ball bearing 6 is pressed into its recess in the mounting plate and the flanged bushing 14 is slid into position with its open cylindrical end abutting against the inner face of the outer race of the ball bearing and secured in that position by means of screws 15 and 16.

Next, the annular member 17 which carries the bifurcated member is positioned in the recess between the periphery of the spacer bushing and the mounting plate. Then the stop ring 18 is placed in the peripheral recess of the flanged spacer bushing and the clamping ring 19 is placed against the stop ring. To complete the mounting plate subassembly, the screws 20 are passed through holes in the mounting plate and the flanged spacer bushing 14 and screwed into the clamping ring 19. However, at this point the clamping ring is not drawn up tight against the stop ring, thereby leaving the latter free to rotate.

Following the completion of the mounting plate sub-assembly the shaft 7 is passed through the central hole in the mounting plate until its shoulder 7a abuts against the outer face of the inner race of the ballbearing. Thereupon the flanged spacer 23 is slid on the shaft until its open cylindrical end fits snugly against the inner face of the inner race of the ballbearing.

Next, the magnetic backing ring 22 and the annular magnetic member 8 are slid on the shaft so that one face of the backing ring fits snugly against the flange of the spacer 23. The rotor assembly is completed by means of a nut 24 lock washer 25 which are screwed on the threaded portion of the shaft until the annular magnetic member and the backing plate are secured tightly for rotation with the shaft.

Finally, the magnet holder is threaded on the mounting plate. As this operation proceeds the pin 26 in the magnet holder engages the trailing surface of the long tine of the bifurcated member. As the threading of the magnet holder on the mounting plate is continued, the pin 26 carries along with it the bifurcated member 17 and likewise the stop ring 18, the stop 18a of which projects into the path of rotation of the bifurcated upright member 17. As the magnet holder advances on the threads on the mounting plate, the pin 26 advances into the slot between the tines of the bifurcated member.

When the desired maximum torque position has been reached i. e., the position of desired minimum air gap between the magnets 9, 9a, 10, 10a, 11, and 12 and the annular magnetic member 8, the clamping ring 19 is tightened against the stop ring 18 by means of the screws 20. When the clamping ring is thus tightened the stop ring 18 is no longer free to rotate. Likewise, the annular member 17 which carries the bifurcated member, although unclamped, cannot be rotated any further in the forward direction since the leading edge of its long tine rests against the trailing edge of the stop 18a on the clamped stop ring 18. However, the magnet holder can be unthreaded approximately one revolution during which the pin 26 rotates the bifurcated member in the reverse direction until the edge of the shorter tine engages the projecting stop 18a. Any further rotation in the reverse direction is prevented by the stop. Thus the minimum torque or maximum air gap position is also determined when the stop ring is clamped.

To facilitate adjusting the torque to any intermediate value between maximum and minimum values the flared beveled end of the magnet holder 1 is provided with calibrated markings which cooperate with a stationary index member. The magnet holder may be threaded to any intermediate position corresponding to a desired value of torque and the spring pressed friction buttons 27a will retain the relatively movable parts in such position against all ordinary vibrations encountered in operation.

In operation, a strand such as a thread or filament runs over the pulley and rotates the shaft 7. As a result the annular magnetic member 8 is rotated in the field of the magnets 9, 9a, 10, 10a, 11, and 12. As it rotates the magnetization of each section of the annular member is repeatedly reversed by recurrent passage between the oppositely poled pairs of magnets. A braking force is thus applied to the rotor as a result of hysteresis loss resulting from such repeated reversal of magnetization. The amount of energy loss and consequently the magnitude of the restraining force is proportional to the area of the hysteresis loop for the particular material of the member 8.

Although in accordance with the provisions of the patent statutes a preferred embodiment of the invention is illustrated and described, modifications will readily suggest themselves to persons skilled in the art without departing from the true spirit of the invention or from the scope of the annexed claims.

What we claim as new and desire to secure by Letters Patent of the United States is:

1. An adjustable torque device comprising a casing including a cylindrical magnet holder having an end wall closing one end thereof and a mounting plate closing the opposite end thereof, a plurality of permanent bar magnets mounted in said magnet holder on said end wall with their magnetic axes parallel to the longitudinal axis of said cylindrical holder, a first annular member of magnetic material, means mounting said annular member adjacent the free ends of said magnets for rotation in its own plane about said longitudinal axis, a second annular member mounted adjacent the inner surface of said mounting plate for rotation about said longitudinal axis and provided at its periphery with two upright members differing in length and spaced apart to provide a slot, a stop ring provided with a peripheral projection extending into the path of rotation of said upright members said cylindrical magnet holder and said mounting plate being in threaded engagement to provide for advancing said magnets toward said first annular member to decrease the air gap therebetween, a pin fixedly mounted in said end wall and advanceable into said slot to rotate said upright members and said stop ring in response to threading said magnet holder and said plate into engagement with each other, and means mounted in said supporting plate for clamping said stop ring against further rotation when said air gap is reduced to a predetermined value, thereby to limit the unthreading of said magnet holder and mounting plate substantially to one revolution.

2. An adjustable torque device comprising a casing including a cylindrical magnet holder having an end wall closing one end thereof and having threads at its open end, a circular mounting plate having threads engaging said first mentioned threads and provided with a shaft opening, a shaft projecting through said opening into the space within said casing, bearing means in said end wall and plate mounting said shaft for rotation, a plurality of pairs of bar permanent magnets mounted in said magnet holder and arranged in a circle concentric with the longitudinal axis of said shaft and with their longitudinal axes parallel to said axis and with poles of unlike polarity adjacent each other, a first annular member of magnetic material mounted on said shaft adjacent the free ends of said magnets, a seocnd annular member mounted on the inner surface of said mounting plate for rotation about the axis of said shaft and provided at its periphery with a bent-up member provided with a slot, a stop ring provided with a peripheral projection extending into the path of rotation of said bent-up member, a pin fixedly mounted in said end wall and rotatable into said slot in said bent-up member to rotate said bent-up member and said projection in response to threading of said cylindrical member and said plate into engagement with each other to decrease the air gap between said magnet and said first annular members, and means mounted in said mounting plate for clamping said stop ring against further rotation when said air gap has been reduced to a predetermined value thereby to limit unthreading of said magnet holder and said support substantially to one revolution.

3. An adjustable torque device comprising a casing including a cylindrical magnet holder having an end wall closing one end thereof and provided with threads at its open end, a circular mounting plate in threaded engagement with the threads of said magnet holder for closing the opposite end and provided with a shaft opening, a shaft projecting through said opening into the space within said casing, bearing means in said end wall and plate mounting said shaft for rotation, a plurality of pairs of bar permanent magnets mounted in said magnet holder with their magnetic axes parallel to the longitudinal axis of said shaft and arranged in a circle surrounding the axis of said shaft, a first annular member of magnetic material fixedly mounted on said shaft adjacent the free ends of said magnets for rotation in its own plane about said longitudinal axis, a second annular member mounted adjacent the inner surface of said mounting plate for rotation about said longitudinal axis and provided at its periphery with two upright members differing in length by an amount exceeding the pitch of said threads and spaced apart to provide a slot exceeding in depth the pitch of said threads, a stop ring mounted for rotation in its own plane about said longitudinal axis and provided with a peripheral projection extending into the path of rotation of said upright member, a pin fixedly mounted in said end wall and advanceable into said slot to rotate said upright members and said stop ring projection in response to threading said magnet holder and said plate into engagement with each other to decrease the air gap between said magnets and said first annular member, and means mounted in said mounting plate for clamping said stop ring against further rotation when said air gap is reduced to a minimum value providing a desired maximum value of braking torque between said magnets and said magnetic annular member and also to limit unthreading of said magnet holder and mounting plate substantially to one revolution to reduce said braking torque a predetermined minimum value.

4. An adjustable torque device comprising a casing including a cylindrical magnet holder having an end wall closing one end thereof and a mounting plate closing the opposite end thereof, a plurality of permanent bar magnets mounted in said magnet holder with their magnetic axis parallel to the longitudinal axis of said cylindrical holder, a first annular member of magnetic material a shaft projecting through said mounting plate, mounting said annular member adjacent the free ends of said magnets for rotation in its own plane about said longitudinal axis, bearings in said mounting plate and said magnet holder mounting said shaft for rotation, a second annular member mounted adjacent the inner surface of said mounting plate for rotation about said longitudinal axis and provided at its periphery with two upright members differing in length and spaced apart to provide a slot open ended toward said end wall, a stop ring provided with a peripheral projection extending into the path of rotation of said upright members, said cylindrical magnet holder and said mounting plate being in threaded engagement to provide for advancing said magnets toward said first annular member to decrease the air gap therebetween, a pin fixedly mounted in said end wall and advanceable into said slot to rotate said upright members and said stop ring in response to threading said magnet holder and said plate into engagement with each other and clamping means for said stop ring comprising a clamping member adjacent the face of said stop ring remote from said mounting plate and screw means extending through said mounting plate and in threaded engagement with said clamping members to tighten said clamping member against said stop ring, when said air gap is reduced to a predetermined value thereby to limit unthreading of said magnet holder and said mounting plate to approximately one revolution, the inner surface of said mounting plate being provided with a plurality of recesses, a friction button in each of said recesses, and spring means in said recesses biasing said friction buttons into engagement with said stop ring to minimize relative rotation of said mounting plate and magnet holder in response to vibration.

EDWIN B. JUDD.
ANTHONY BUTRYM.

No references cited.